United States Patent [19]
Meeker et al.

[11] Patent Number: 6,167,421
[45] Date of Patent: Dec. 26, 2000

[54] METHODS AND APPARATUS FOR PERFORMING FAST MULTIPLICATION OPERATIONS IN BIT-SERIAL PROCESSORS

[75] Inventors: Woodrow Meeker, Orlando; Andrew P. Abercrombie, Winter Park; Michele D. Van Dyke-Lewis, Orlando, all of Fla.

[73] Assignee: TeraNex, Inc., Orlando, Fla.

[21] Appl. No.: 09/057,571

[22] Filed: Apr. 9, 1998

[51] Int. Cl.$^7$ ........................................... G06F 7/52
[52] U.S. Cl. ............................................. 708/626
[58] Field of Search .................... 708/626, 627, 708/628

[56] References Cited

U.S. PATENT DOCUMENTS

| | | | |
|---|---|---|---|
| 3,582,634 | 6/1971 | Bartlett | 708/627 |
| 3,795,880 | 3/1974 | Singh et al. | 708/626 |
| 3,950,636 | 4/1976 | Dao | 708/626 |
| 4,228,520 | 10/1980 | Letteney et al. | 708/629 |
| 4,796,219 | 1/1989 | Williams | 708/626 |
| 5,031,137 | 7/1991 | Elrod | 708/626 |
| 5,095,457 | 3/1992 | Jeong | 708/626 |
| 5,798,956 | 8/1998 | Park | 708/626 |

FOREIGN PATENT DOCUMENTS 0 145 533   6/1985   European Pat. Off. .

OTHER PUBLICATIONS

Hawkins, H. Yao et al., "Serial–Parallel Multipliers." Proceedings of the Asilomar Conference on Signals, Systems and Computers, Pacific Grove, Nov. 1–3, 1993, vol. 1, No. Conf. 27, pp. 359–363.

Kornerup, P., "A Systolic, Linear–Array Multiplier for a Class of Right–Shift Algorithms." IEEE Transactions on Computers, vol. 43, No. 8, Aug. 1, 1994, pp. 892–898.

Zuehlke, W., "Verkuerzte Multiplikation und Division." Nachrichtentechnik Elektronik, vol. 30, No. 4, Jan. 1, 1980, pp. 150–152.

Sait, Sadiq M. et al., "A Novel Technique for Fast Multiplication." Proceedings of the Annual International Phoenix Conference on Computers and Communications, Scottsdale, Mar. 28–31, 1995, No. Conf. 14, Mar. 28, 1995, pp. 109–114.

*Primary Examiner*—David H. Malzahn
*Attorney, Agent, or Firm*—Burns, Doane, Swecker & Mathis, LLP

[57] ABSTRACT

Bit-serial processors quickly multiply multiple-bit operands using significantly fewer clock cycles as compared to conventional bit-serial implementations. Exemplary embodiments process groups of operand bits simultaneously to provide the significant speed increases. Advantageously, however, the exemplary embodiments utilize logic and memory architectures which are fully compatible with, and fully useful for, conventional bit-serial applications, and the embodiments thus provide fast multiple-bit multiplications while at the same time providing all of the advantages typically associated with conventional bit-serial processors.

12 Claims, 4 Drawing Sheets

METHODS AND APPARATUS FOR PERFORMING FAST MULTIPLICATION OPERATIONS IN BIT-SERIAL PROCESSORS

Some aspects of the present invention were made with Government support under Contract No. F08630-95-2-0001 awarded by Air Force Wright Laboratory Armament Directorate. The Government may have certain rights in this invention.

FIELD OF THE INVENTION

The present invention relates to bit-serial processors, and more particularly, to methods and apparatus for performing multiplication operations involving multiple-bit operands in bit-serial processors.

BACKGROUND OF THE INVENTION

Today, bit-serial processors are in widespread use. For example, bit-serial processors are commonly used to efficiently carry out pixel, or bit-plane, operations in image processing applications. See, for example, U.S. patent application Ser. No. 09/057,482, entitled "Mesh Connected Computer" (filed on Apr. 9, 1998 in the name of Abercrombie), which describes a system for performing image processing operations using arrays of coupled bit-serial processors. As the teachings of the present invention are useful in a system such as that described in the aforementioned patent application, the aforementioned patent application is incorporated herein in its entirety by reference. Those skilled in the art will appreciate, however, that the teachings of the present invention are broadly applicable in bit-serial processors generally, irrespective of the particular form of bit-serial processor in which the invention is employed.

Generally, and for purposes of the discussion that follows, a bit-serial processor is any processor including an arithmetic logic unit configured to operate on single-bit, or few-bit, data and/or control inputs. The arithmetic logic used to construct such a bit-serial processor is typically minimal, and such logic is most often used to access and process only single-bit operands within a given clock cycle. Thus, an individual bit-serial processor typically provides an elemental computing platform. However, when many bit-serial processors are coupled in a strategic fashion, they are quite powerful, and extremely fast, particularly in applications in which a common operation must be performed simultaneously on many single-bit, or few-bit, operands. Such is often the case, for example, in image processing applications, wherein entire pixel-data bit-planes are manipulated in unison. See, for example, the above incorporated patent application.

By definition, then, conventional bit-serial processors require many clock cycles to perform multi-pass operations such as multiplying or dividing two multiple-bit numbers. Whereas a multiple-bit processor can employ considerable arithmetic and control logic to enable multiple-bit computations to occur within a single or very few clock cycles, conventional bit-serial processors expend many clock cycles performing multiple-bit computations in a multiple-pass fashion. Nonetheless, an ability to quickly perform multiple-bit computations is often critical to the overall performance of a bit-serial processing application. Consequently, there is a need for improved methods and apparatus for performing multiple-bit operations using bit-serial processors.

SUMMARY OF THE INVENTION

The present invention fulfills the above-described and other needs by providing methods and apparatus for quickly multiplying multiple-bit operands using bit-serial processors. Advantageously, embodiments of the invention accomplish fast multiple-bit multiplications using logic and memory architectures which are fully compatible with conventional bit-serial implementations. Thus, the present invention provides fast multiple-bit multiplications while maintaining the true bit-serial nature of conventional architectures. As a result, embodiments of the invention provide all of the advantages of conventional bit-serial processors while also providing multiple-bit multiplications which are two to three times faster as compared to conventional methods.

In a first exemplary embodiment, a group of two or more bits of a multiple-bit multiplier are processed simultaneously. Specifically, each bit of the multiple-bit multiplier group is used to mask an appropriate bit of a first group of multiplicand bits (the number of bits in the first multiplicand group being equal to the number of bits in the multiplier group) to produce a group of output bits of equal significance. The multiple output bits are summed in an arithmetic logic unit, and a sum output is stored in a running accumulator. The same group of multiplier bits is then used to mask successive groups of multiplicand bits in the same fashion until the entire multiplicand has been multiplied by the multiplier group and the result is stored in the accumulator. During each clock cycle, an accumulator value and one or more carries out from the previous clock cycle are included in the sum for the current clock cycle. Once processing for the first group of multiplier bits is complete, successive groups of multiplier bits are then processed in a similar fashion to accomplish the full multiplication of all the multiplicand bits by all of the multiplier bits, with the final result being stored in the accumulator. Since multiple-bit groups of the multiplier are treated together, the overall multiplication operation according to the embodiment is much faster than a conventional bit-serial multiplication in which each bit of the multiplier is treated separately (and multiplied by each bit of the multiplicand). However, because the embodiment utilizes single-bit registers and an accumulator which is fully compatible with, and useful for, conventional bit-serial operations, the embodiment also provides all the advantages typically associated with a bit-serial processor.

In an alternative exemplary embodiment, a bit-serial processor according to the invention encodes successive groups of multiplier bits to provide control signals which are in turn used to select appropriate multiplicand bits for input to an arithmetic logic unit. By doing so, the alternative embodiment produces a complete multiplication result using a significantly reduced number of clock cycles as compared to conventional bit-serial processors. Again, however, because the alternative exemplary embodiment utilizes single-bit registers and an accumulator which is fully compatible with, and useful for, conventional bit-serial operations, the alternative embodiment also provides all the advantages of a conventional bit-serial processor.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Generally, the present invention demonstrates that each pass of a multiple-bit multiplication operation can incorporate multiple conventional multiply steps, thereby reducing the number of clock cycles required to perform the multiply operation, without requiring hardware beyond that found in a typical conventional bit-serial processor. The methods and apparatus of the present invention thus conform to the bit-serial nature of conventional implementations while providing a factor of two to three speedup in multiplication execution. In the discussion that follows, the term pass is used to describe a series of bit operations or (in the context of bit serial processors) clock cycles. In other words, multiple bit operations can be executed in a single pass, and a single pass can thus include many clock cycles.

Figure 1:
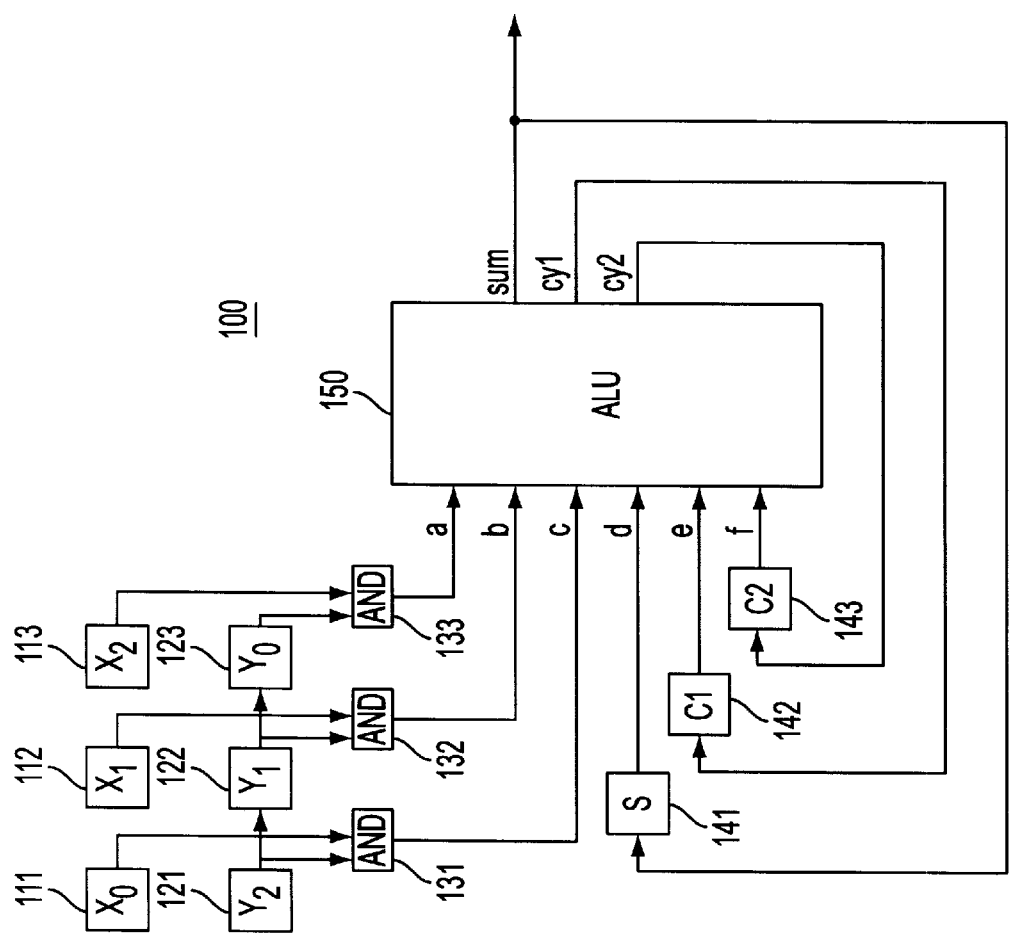
FIG. 1 depicts an exemplary bit-serial processor according to the invention, the exemplary processor providing for fast multiple-bit multiplication operations.

According to a first exemplary embodiment, a fast multiply technique is utilized whereby, in each of one or more passes, a multiply between a group of multiplier bits and the multiplicand is performed, with the result being summed in a running accumulator. A bit-serial architecture 100 for performing the exemplary technique using groups of three multiplier bits is depicted in FIG. 1. Those skilled in the art will appreciate that, generally, groups of two or more multiplier bits can be used and that the three-bit group implementation of FIG. 1 is provided by way of illustration.

In FIG. 1, the exemplary bit-serial processor 100 includes first, second and third multiplier bit registers 111, 112, 113, first, second and third multiplicand bit registers 121, 122, 123, first, second and third logical-AND gates 131, 132, 133, a sum bit register 141, a least significant carry bit register 142, a most significant carry bit register 143, and an arithmetic logic unit 150. As shown, outputs of the first multiplier bit register 111 and the first multiplicand bit register 121 are coupled to logic inputs of the first logical-AND gate 131, outputs of the second multiplier bit register 112 and the second multiplicand bit register 122 are coupled to logic inputs of the second logical-AND gate 132, and outputs of the third multiplier bit register 113 and the third multiplicand bit register 123 are coupled to logic inputs of the third logical-AND gate 133.

Additionally, logic outputs of the third, second and first logical-AND gates 133, 132, 131 are coupled to first, second and third inputs a, b, c of the arithmetic logic unit 150, respectively. The arithmetic logic unit 150 provides a sum output SUM, a least significant carry bit output CY1, and a most significant carry bit output CY2. The sum output is coupled to an input of the sum bit register 141, the least significant carry bit output CY1 is coupled to an input of the least significant carry bit register 142, and the most significant carry bit output CY2 is coupled to an input of the most significant carry bit register 143. Further, outputs of the sum, least significant carry bit, and most significant carry bit registers 141, 142, 143 are coupled to fourth, fifth and sixth inputs d, e, f of the arithmetic logic unit 150, respectively.

In operation, three multiplier bits $X_i$, $X_{i+1}$, $X_{i+2}$ mask (i.e., are ANDed with) three multiplicand bits $Y_{j+2}$, $Y_{j+1}$, $Y_j$, respectively, such that, on a given clock, three multiplication bits of equal significance are generated as the first, second and third inputs a,b,c to the arithmetic logic unit 150. As described in more detail below, the arithmetic logic unit 150 then sums the three resulting multiplication bits along with an accumulator bit, a least significant carry bit (counting as 1), and a most significant carry bit (counting as 2) from a previous clock cycle (prior to the first clock cycle, the accumulator and the carry bits are effectively zero).

At the beginning of a multiply step, the multiplier bits $X_i$, $X_{i+1}$, $X_{i+2}$ are loaded to the multiplier bit registers 111, 112, 113, respectively. Additionally, the multiplicand bits are loaded to the first multiplicand bit register 121 one by one. In other words, as one bit is loaded to the first multiplicand bit register 121, the prevailing value of the first multiplicand bit register 121 is passed on to the second multiplicand bit register 122, and the prevailing value of the second multiplicand bit register 122 is passed on to the third multiplicand bit register 123. Thus, at any given time, the values in the first, second and third multiplicand bit registers 121, 122, 123 are successive multiplicand bits $Y_{j+2}$, $Y_{j+1}$, $Y_j$, respectively.

As the first multiplicand bit register 121 loads bit $Y_j$, the accumulator bit $a_j$ is loaded to the sum bit register 141. The new accumulator bit $a_j$ is then stored from the SUM output of the arithmetic logic unit 150 on the following clock. During each clock cycle, the least significant carry bit CY1 is propagated to the least significant carry bit register 142, and the most significant carry bit CY2 is propagated to the most significant carry bit register 143. The sum and carry bit register values are then supplied, respectively, to the fourth, fifth and sixth inputs d, e, f of the arithmetic logic unit 150 for the next clock cycle.

Figure 3:
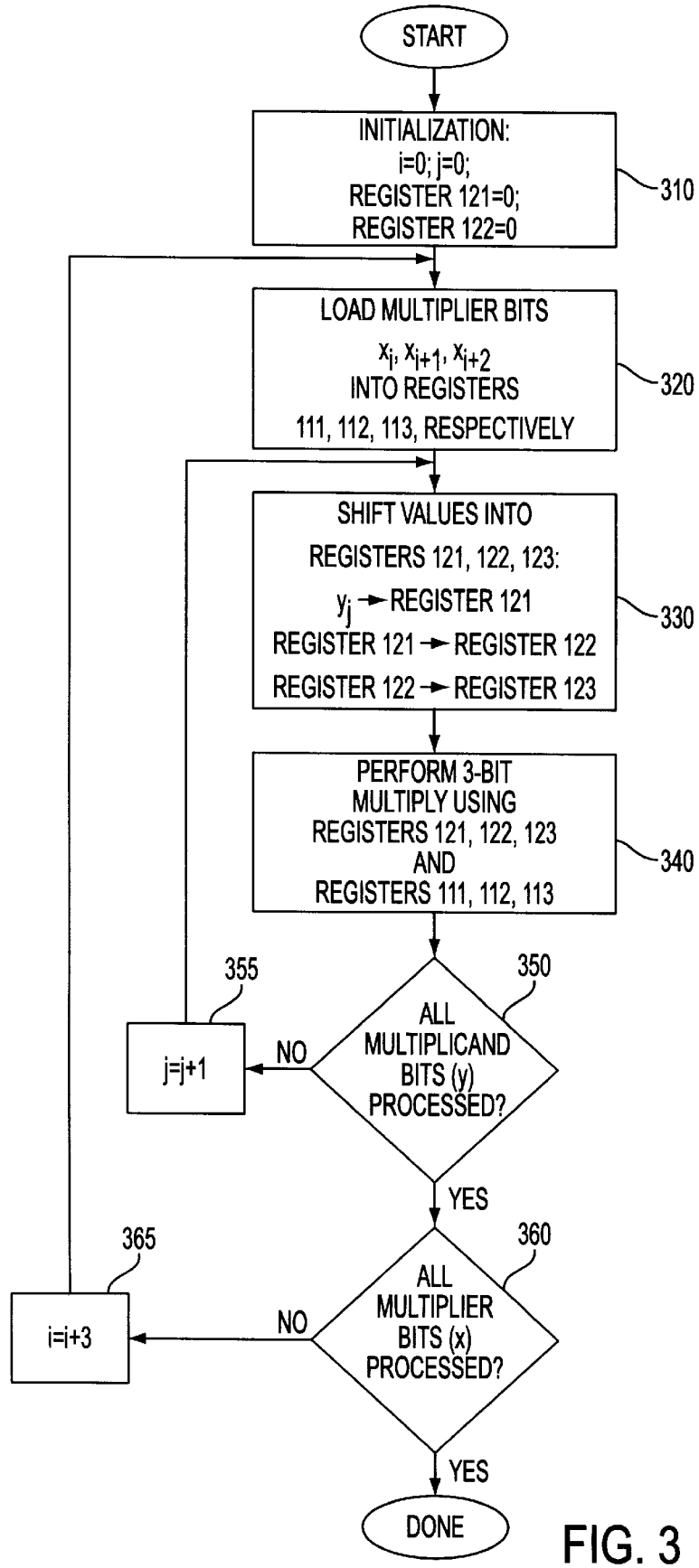
FIG. 3 depicts an exemplary fast multiplication algorithm according to the invention.

The overall multiplication operation is then staged as a series of 3-bit multiplication passes, each pass representing a multiplication of the multiplicand by 3 bits of the multiplier, as well as the addition of the resulting product to the accumulator. This overall multiplication process is depicted by way of a flow chart in FIG. 3. In FIG. 3, processing begins at step 310, where two counters i, j and two of the multiplicand registers 121, 122 are initialized to zero. Thereafter, at steps 320 and 330, three multiplier bits $X_i$, $X_{i+1}$, $X_{i+2}$ are loaded into the multiplier registers 111, 112, 113, respectively, and a first multiplicand bit $Y_j$ is loaded into the first multiplicand register 121 while the values in the first and second multiplicand registers 121, 122 are shifted into the second and third multiplicand registers 122, 123, respectively. Thereafter, at step 340, a complete three-bit multiply is executed. In other words, the values of the multiplier and multiplicand registers are pair-wise ANDed as described above, and the resulting equally significant three bits are summed and added to a running accumulator (which is effectively zero prior to processing).

At step 350, a determination is made as to whether all of the multiplicand bits have been processed (i.e., shifted through each multiplicand register 121, 122, 123). If not, then the second counter (j) is incremented at step 355 and processing of multiplicand bits continues at step 330. However, if each multiplicand bit has been processed, then a determination is made, at step 360, as to whether all of the multiplier bits have been processed (i.e., loaded into one of the multiplier registers 111, 112, 113). If not, then the first counter (i) is increased by 3, and processing of multiplier bits resumes at step 320. However, if all multiplier bits have been processed, the multiplication is complete and the accumulator reflects the final product of the multiplier and the multiplicand. Those skilled in the art will appreciate that a signed multiply can be accomplished by inverting the first input (a) to the arithmetic logic unit 150 during the last pass.

Since 3-bit groups of the multiplier are processed simultaneously, the number of clock cycles required to carry out the entire multiplication operation is significantly reduced as compared to the conventional approach of methodically multiplying each multiplier bit by each multiplicand bit. Further, since the various bit registers, the logical-AND gates and the arithmetic logic unit of FIG. 1 are typically found, or are easily incorporated, within bit-serial processors (see, for example, the above cited patent application entitled "Mesh Connected Computer"), the exemplary group-wise multiplication adds little complexity and maintains true bit-serial functionality. In this regard, note that the logical-AND gates of FIG. 1 are conceptual and are typically implemented using controllable mask registers.

Figure 2:
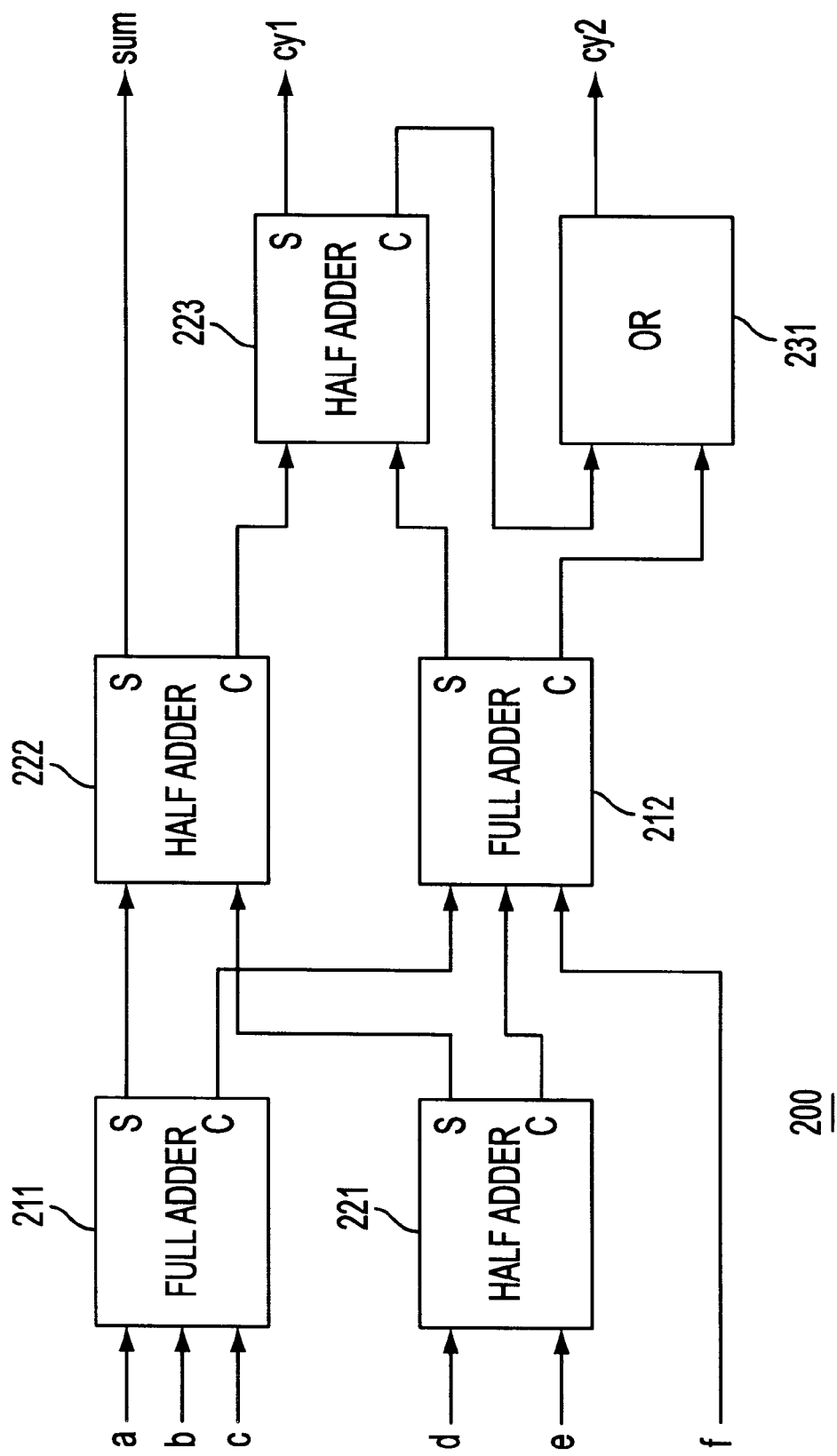
FIG. 2 depicts an exemplary arithmetic logic unit which can be used in a bit-serial processor such as that shown in FIG. 1.

To perform the above described 3-bit group-wise multiply, the arithmetic logic unit 150 functions as a six-input adder, providing a SUM output and two carry outputs CY1, CY2. FIG. 2 depicts an exemplary arithmetic logic unit 200 which provides such functionality. In FIG. 2, the arithmetic logic unit 200 includes first and second full adders, 211, 212, first, second and third half adders 221, 222, 223, and a logical-OR gate 231. As shown, the first, second and third arithmetic logic unit inputs a, b, c are coupled to first, second and third inputs of the first full adder 211, respectively. Additionally, the fourth and fifth arithmetic logic unit inputs d, e are coupled to first and second inputs of the first half adder 221, and the sixth arithmetic logic unit f is coupled to a first input of the second full adder 212.

A sum output of the first full adder 211 is coupled to a first input of the second half adder 222, and a carry output of the first full adder 211 is coupled to a second input of the second full adder 212. A sum output of the first half adder 221 is coupled to a second input of the second half adder 222, and a carry output of the first half adder 221 is coupled to a third input of the second full adder 212. A sum output of the second half adder 222 provides the SUM output for the arithmetic logic unit 200 and a carry output of the second half adder 222 is coupled to a first input of the third half adder 223. A sum output of the second full adder 212 is coupled to a second input of the third half adder 223, and a carry output of the second full adder 212 is coupled to a first input of the logical-OR gate 231. A sum output of the third half adder 223 provides the least significant carry bit output CY1 of the arithmetic logic unit 200, and a carry output of the third half adder 223 is coupled to a second input of the logical-OR gate 231. An output of the logical OR-gate 231 provides the most significant carry bit output CY2 of the arithmetic logic unit 200.

In operation, each of the half adders 221, 222, 223 provides a two-bit sum of two single-bit inputs. The truth table for such a half adder is shown below in Table I. In practice, the sum output of a half adder can be computed as a logical-XOR of the two single-bit inputs, and the carry output of a half adder can be computed as a logical-AND of the two single-bit inputs. In Table I, the two half adder outputs are designated as single-bit values Sum and Carry, but these outputs can alternately be viewed in combination as a two-bit sum.

TABLE I

Half Adder Truth Table

| Input 1 | Input 2 | Output: sum ("S") | Output: carry ("C") |
|---------|---------|-------------------|---------------------|
| 0 | 0 | 0 | 0 |
| 0 | 1 | 1 | 0 |
| 1 | 0 | 1 | 0 |
| 1 | 1 | 0 | 1 |

Each of the full adders 211, 212 of FIG. 2 provides a sum and carry output based on three single-bit input signals. In practice, the sum output is typically computed as a logical-XOR of the three input bits, and the carry output is computed as a logical-MAJORITY of the three input bits. The truth table for such a full adder is shown in Table II. The sum and carry outputs of the full adders 211, 21 can alternately be viewed as a two-bit sum derived from the three single-bit inputs.

TABLE II

| Input 1 | Input 2 | Input 3 | Output: sum ("S") | Output: carry ("C") |
|---------|---------|---------|-------------------|---------------------|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

The arrangement of full adders 211, 212 and half adders 221, 222, 223 of FIG. 2 thus provides the above described six-input (a, b, c, d, e, f), three-output (SUM, CY1, CY2) functionality. Since the most significant carry output CY2 is a higher-significance bit than CY1, a propagated CY2 output counts as 2 at the arithmetic logic input (i.e., at input f), making the six-input adder capable of generating sums between 0 and 7 (where the three outputs SUM, CY1 and CY2 represent the three-bit sum).

In addition to six-bit addition, the same arithmetic logic unit arrangement can be used to perform a variety of other useful functions. For example, if three of the arithmetic logic unit inputs (specifically, the fourth, fifth and sixth inputs d, e, f) are zeroed, the exemplary arithmetic logic unit 200 functions as a simple full adder. In such case, the SUM output supplies the sum for each bit operation and the least significant carry output CY1 provides the carry out which may be propagated to a following bit operation. To perform a subtraction, the second arithmetic logic unit input b is complemented (and for two's complement subtraction, the third arithmetic logic unit input c is initialized to 1 in preparation for the first bit operation).

Additional functionality of the exemplary arithmetic logic unit 200 is described, for example, in the above incorporated patent application ("Mesh Connected Processor"). While the arithmetic logic unit 200 of FIG. 2 is quite useful in certain applications, those skilled in the art will appreciate that the arithmetic logic unit 200 is provided for purposes of illustration, and that any logic circuitry providing the desired six-input, three-output truth table can be used to perform the above described group-wise multiplication operation.

According to an alternative embodiment of the invention, multiplication speed improvements are achieved by realizing that multiplication by any n-bit multiplier (where n is even) can be accomplished by performing at most (n/2+1)

adds and/or subtracts of a bit-shifted version of the multiplicand. For example, multiplication of a multiplicand Y by a binary multiplier X=0100 1101 0011 1010 (i.e., n=16) requires 16/2=8 additions/subtractions. To see this, realize that the multiplication can be accomplished one multiplier nibble (4 bits) at a time and that each multiplier nibble containing more than two 1's can be converted to a sum or difference of two nibbles, each nibble containing only a single 1 (possibly requiring a carry out to the next higher nibble). The nibble-wise multiplication is then carried out as follows (where the symbol "<<" indicates a left shift and A represents the accumulated result):

Nibble 1.    A = 0 + (M << 1) + (M << 3); (1010)
Nibble 2.    A = A − (M << 4) + (M << 6); (0011 = 0100 − 0001)
Nibble 3.    A = A + (M << 8) − (M << 10);
            (1101 = 0001 − 0100 with carry out)
Nibble 4.    A = A + (M << 12) + (M << 14);
            (0100 with carry in = 0101 = 0100 × 0001).

Thus, given a mapping from every possible multiplier nibble to a unique indicator which identifies a shifted version of the multiplicand (and whether the shifted version should be added to or subtracted from the accumulator), a multiplication can be executed by treating successive multiplier nibbles as code words, each code word indicating which bits of a multiplicand are to be added to or subtracted from corresponding bits of a running accumulator. This process is described in more detail below with respect to FIG. 4.

Table III shows one possible mapping of multiplier nibbles to corresponding add/subtract operations of multiplicand bits. For example, a multiplier pattern of 0001 maps to a '+' at S0 (indicating that an unshifted version of the multiplicand should be added to the accumulator), and 0011 maps to an add at S2 and a subtract at S0 (i.e., 3=4−1, indicating that a twice shifted multiplicand should be added and an unshifted version should be subtracted). Note that some multiplier nibbles require that a binary 1 be added to the next higher nibble. For example, in the case of multiplier nibble 1111, the implementation is 16−1=15, requiring a carry out to the next higher nibble. Thus, a carry column C is included in Table III.

TABLE III

| X3 | X2 | X1 | X0 | S3 | S2 | S1 | S0 | C |
|----|----|----|----|----|----|----|----|---|
| 0  | 0  | 0  | 0  | 0  | 0  | 0  | 0  | 0 |
| 0  | 0  | 0  | 1  | 0  | 0  | 0  | +  | 0 |
| 0  | 0  | 1  | 0  | 0  | 0  | +  | 0  | 0 |
| 0  | 0  | 1  | 1  | 0  | +  | 0  | −  | 0 |
| 0  | 1  | 0  | 0  | 0  | +  | 0  | 0  | 0 |
| 0  | 1  | 0  | 1  | 0  | +  | 0  | +  | 0 |
| 0  | 1  | 1  | 0  | 0  | +  | +  | 0  | 0 |
| 0  | 1  | 1  | 1  | +  | 0  | 0  | −  | 0 |
| 1  | 0  | 0  | 0  | +  | 0  | 0  | 0  | 0 |
| 1  | 0  | 0  | 1  | +  | 0  | 0  | +  | 0 |
| 1  | 0  | 1  | 0  | +  | 0  | +  | 0  | 0 |
| 1  | 0  | 1  | 1  | 0  | −  | 0  | −  | 1 |
| 1  | 1  | 0  | 0  | 0  | −  | 0  | 0  | 1 |
| 1  | 1  | 0  | 1  | 0  | −  | 0  | +  | 1 |
| 1  | 1  | 1  | 0  | 0  | 0  | −  | 0  | 1 |
| 1  | 1  | 1  | 1  | 0  | 0  | 0  | −  | 1 |

While many different mappings are possible, the exemplary mapping shown in Table III is particularly useful in that it never requires more than one operation (i.e., an add or a subtract) for each pair (S0/S1, S2/S3) of shift positions.

Figure 4:
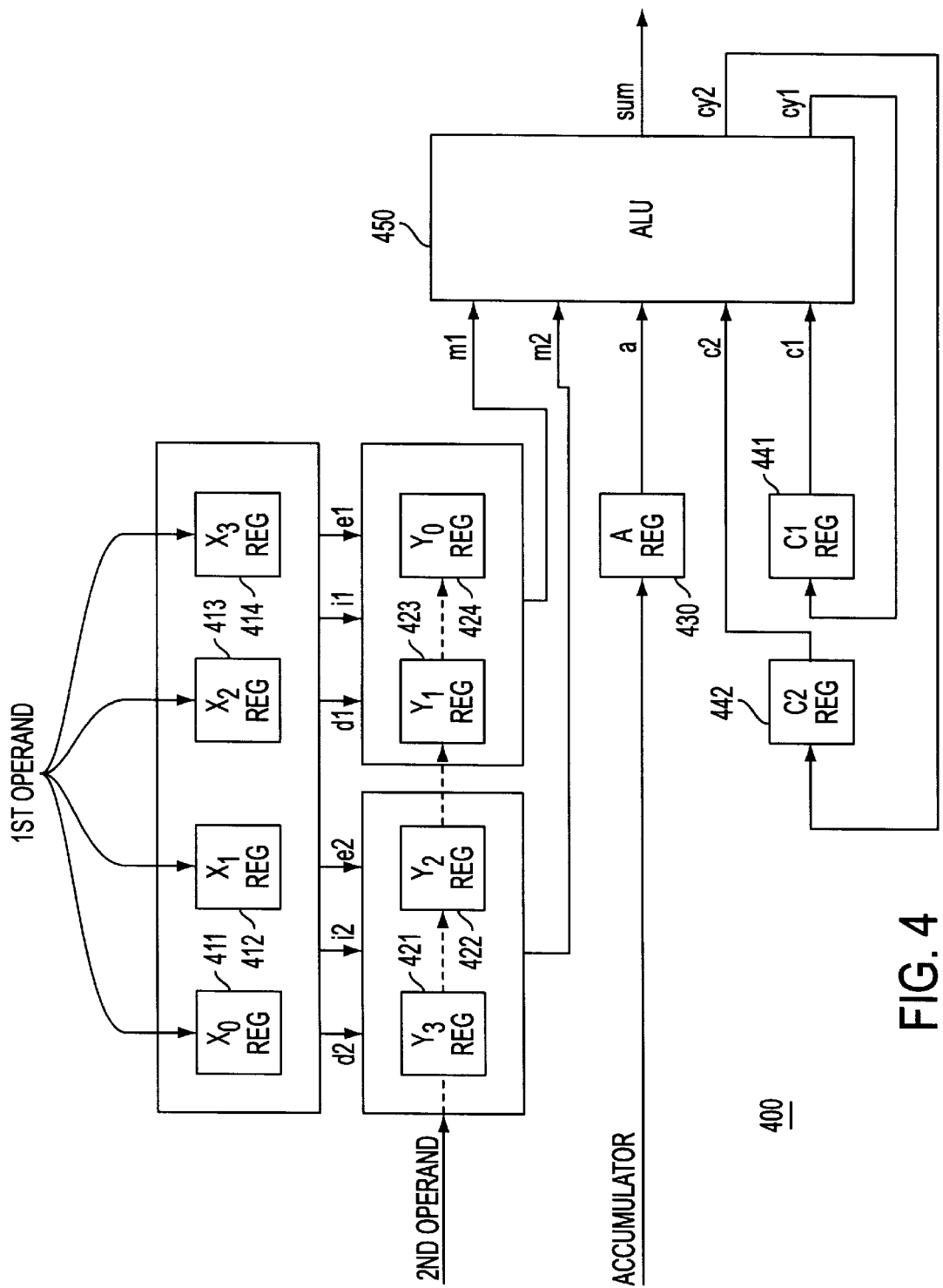
FIG. 4 depicts an alternative exemplary bit-serial processor according to the invention, the alternative processor providing for fast multiple-bit multiplication operations.

Thus, given the mapping of Table III, an efficient bit-serial multiplier can be constructed as shown, by way of example, in FIG. 4. In FIG. 4, an exemplary bit-serial processor 400 includes first through fourth multiplier registers 411, 412, 413, 414, first through fourth multiplicand registers 421, 422, 423, 424, an accumulator bit register 430, first and second carry bit registers 441, 442 and an arithmetic logic unit 450.

In operation, bits of a multiplier X are loaded, four bits at a time, into the multiplier bit registers 411, 412, 413, 414, such that the most significant of the four multiplier bits is in the fourth multiplier bit register 414 and the least significant of the four multiplier bits is in the first multiplier bit register 411. Once a nibble of multiplier bits has been loaded, bits of a multiplicand Y are clocked into the multiplicand bit registers 421, 422, 423, 424 such that each multiplicand bit, beginning with the least significant multiplicand bit, enters the first multiplicand bit register 421 and is ultimately shifted through each of the other multiplicand bit register 422, 423, 424. As shown, the multiplier nibble in the multiplier registers 411, 412, 413, 414 is decoded to provide six control signals d1, i1, e1, d2, i2, e2. The first three control signals d1, i1, e1 establish, as described below, which of the multiplicand bits in the third and fourth multiplicand bit registers 423, 424 is passed as a first input m1 to the arithmetic logic unit 450 at each clock cycle. Similarly, the second three control signals d2, i2, e2 establish, as is also described below, which of the multiplicand bits in the first and second multiplicand bit registers 421, 422 is passed as a second input m2 to the arithmetic logic unit 450 at each clock cycle. During each clock cycle, the arithmetic logic unit 450 sums the first and second inputs m1, m2 with an accumulator bit (a) and first and second carry bits c1, c2 as shown.

Operation of the exemplary processor 400 of FIG. 4 can be understood with reference to Table IV which provides an exemplary mapping between the entries of Table III and the control signals d1, i1, e1, d2, i2, e2 (and corresponding first and second arithmetic logic unit inputs m1, m2) of FIG. 4. According to the mapping of Table IV, the first arithmetic logic unit input m1 is generated by: using the first control signal (i.e., d1, which may be thought of as a delay or shift with respect to the accumulator bit being input to the arithmetic logic unit 450 on a given clock cycle) to select between the data bits in the third and fourth multiplicand bit registers 423, 424; XOR-ing the selected data bit with the second control signal (i.e., i1, which may be thought of as an inverter) to establish that the selected bit will be added or subtracted as appropriate; and AND-ing the result with the third control signal (i.e., e1, which may be thought of as an enable signal) to establish whether the selected bit will indeed be added or subtracted in the arithmetic logic unit 450. The second logic unit input m2 is generated in a similar fashion using the remaining control signals d2, i2, e2. When a subtraction is performed (i.e., when one or both of the inversion control signals i1, i2 is active), a carry in is performed during the first clock cycle (for two's compliment arithmetic). For example, if one of the inverter control signals i1, i2 is active, the first carry register 142 can be loaded with a binary 1 for the first clock cycle, and if both inverter control signals i1, i2 are active, the second carry register 143 can be loaded with a binary 1 for the first clock cycle.

TABLE IV (! = NOT = Inverted Value)

| X3 | X2 | X1 | X0 | S0 | S1 | S2 | S3 | C | D1 | I1 | E1 | D2 | I2 | E2 | m1 | m2 |
|----|----|----|----|----|----|----|----|---|----|----|----|----|----|----|----|----|
| 0 | 0 | 0 | 0 | 0 | 0 | 0 | 0 | 0 | x | x | 0 | x | x | 0 | 0 | 0 |
| 0 | 0 | 0 | 1 | 0 | 0 | 0 | + | 0 | x | x | 0 | 0 | 0 | 1 | 0 | y3 |
| 0 | 0 | 1 | 0 | 0 | 0 | + | 0 | 0 | x | x | 0 | 1 | 0 | 1 | y1 | y2 |
| 0 | 0 | 1 | 1 | 0 | + | 0 | - | 0 | 0 | 0 | 1 | 0 | 1 | 1 | y1 | !y3 |
| 0 | 1 | 0 | 0 | 0 | + | 0 | 0 | 0 | 0 | 0 | 1 | x | x | 0 | y1 | 0 |
| 0 | 1 | 0 | 1 | 0 | + | 0 | + | 0 | 0 | 0 | 1 | 0 | 0 | 1 | y1 | y3 |
| 0 | 1 | 1 | 0 | 0 | + | + | 0 | 0 | 0 | 0 | 1 | 1 | 0 | 1 | y1 | y2 |
| 0 | 1 | 1 | 1 | + | 0 | 0 | - | 0 | 1 | 0 | 1 | 0 | 1 | 1 | y0 | !y3 |
| 1 | 0 | 0 | 0 | + | 0 | 0 | 0 | 0 | 1 | 0 | 1 | x | x | 0 | y0 | 0 |
| 1 | 0 | 0 | 1 | + | 0 | 0 | + | 0 | 1 | 0 | 1 | 0 | 0 | 1 | y0 | y3 |
| 1 | 0 | 1 | 0 | + | 0 | + | 0 | 0 | 1 | 0 | 1 | 1 | 0 | 1 | y0 | y2 |
| 1 | 0 | 1 | 1 | 0 | - | 0 | - | 1 | 0 | 1 | 1 | 0 | 1 | 1 | !y1 | !y3 |
| 1 | 1 | 0 | 0 | 0 | - | 0 | 0 | 1 | 0 | 1 | 1 | x | x | 0 | !y1 | 0 |
| 1 | 1 | 0 | 1 | 0 | - | 0 | + | 1 | 0 | 1 | 1 | 0 | 0 | 1 | !y1 | y3 |
| 1 | 1 | 1 | 0 | 0 | 0 | - | 0 | 1 | x | x | 0 | 1 | 1 | 1 | 0 | !y2 |
| 1 | 1 | 1 | 1 | 0 | 0 | 0 | - | 1 | x | x | 0 | 0 | 1 | 1 | 0 | !y3 |

Thus Table IV provides a complete mapping between all possible multiplier nibbles and the first and second arithmetic logic unit inputs m1, m2. For example, for the X nibble 0010, the '+' in the S2 column results in the Y2 data (i.e., the multiplicand bit in the second multiplier register 422 during a given clock cycle) being coupled to the second arithmetic logic unit input m2 for addition (i.e., the Y2 data is non-inverted). As a result, for each multiplier nibble loaded into the multiplier registers 411, 412, 413, 414, a single pass through the multiplicand bits (i.e., shifting the multiplicands through the multiplicand registers 421, 422, 423, 424) effectively adds two shifted versions of the multiplicand to the accumulator as desired. As a result, once all of the multiplier nibbles have been processed (i.e., successively loaded into the multiplier registers 111, 112, 1 13, 114 and used to select appropriate bits of the multiplicand for input to the logic unit 450), the accumulator contains the true multiple-bit product of the multiplier and the multiplicand.

Advantageously, since 4-bit groups of the multiplier are processed simultaneously, the number of clock cycles required to carry out the entire multiplication operation is significantly reduced as compared to the conventional approach of methodically multiplying each multiplier bit by each multiplicand bit. For example, the number of clock cycles required for an 8-bit multiply are reduced from 80 to 35 (or from 290 to 100 for a 16-bit multiply, from 625 to 200 for a 24-bit multiply, and from 1090 to 290 for a 32-bit multiply). Further, since the various bit registers and the arithmetic logic unit of FIG. 4 are typically found, or are easily incorporated, within bit-serial processors (see, for example, the above cited patent application entitled "Mesh Connected Computer"), the alternative group-wise multiplication adds little complexity and maintains true bit-serial functionality.

As noted above, the alternative embodiment of FIG. 4 utilizes an arithmetic logic unit which functions as a 5-input adder (with inputs m1, m2, a, c1, c2). Each of the inputs is of equal significance except for the second, or most significant carry c2, which counts as 2 (i.e., c1 and c2 taken together form a 2-bit number). Such an adder can, on a given bit operation, generate a sum that ranges from 0 to 6. The adder therefore provides the three outputs sum, cy1, cy2. The carry bits c1, c2 carry out to the next bit operation and as such represent significance of 2 and 4 as outputs of the current operation, but are of significance 1 and 2 as inputs to the next operation. A truth table for the five-input adder is shown in Table V below. Construction of such a five-input adder is well known to those skilled in the art.

TABLE V

| c2 | c1 | m2 | m1 | a | C2 | C1 | P |
|----|----|----|----|---|----|----|---|
| 0 | 0 | 0 | 0 | 0 | 0 | 0 | 0 |
| 0 | 0 | 0 | 0 | 1 | 0 | 0 | 1 |
| 0 | 0 | 0 | 1 | 0 | 0 | 0 | 1 |
| 0 | 0 | 0 | 1 | 1 | 0 | 1 | 0 |
| 0 | 0 | 1 | 0 | 0 | 0 | 0 | 1 |
| 0 | 0 | 1 | 0 | 1 | 0 | 1 | 0 |
| 0 | 0 | 1 | 1 | 0 | 0 | 1 | 0 |
| 0 | 0 | 1 | 1 | 1 | 0 | 1 | 1 |
| 0 | 1 | 0 | 0 | 0 | 0 | 0 | 1 |
| 0 | 1 | 0 | 0 | 1 | 0 | 1 | 0 |
| 0 | 1 | 0 | 1 | 0 | 0 | 1 | 0 |
| 0 | 1 | 0 | 1 | 1 | 0 | 1 | 1 |
| 0 | 1 | 1 | 0 | 0 | 0 | 1 | 0 |
| 0 | 1 | 1 | 0 | 1 | 0 | 1 | 1 |
| 0 | 1 | 1 | 1 | 0 | 0 | 1 | 1 |
| 0 | 1 | 1 | 1 | 1 | 1 | 0 | 0 |
| 1 | 0 | 0 | 0 | 0 | 0 | 1 | 0 |
| 1 | 0 | 0 | 0 | 1 | 0 | 1 | 1 |
| 1 | 0 | 0 | 1 | 0 | 0 | 1 | 1 |
| 1 | 0 | 0 | 1 | 1 | 1 | 0 | 0 |
| 1 | 0 | 1 | 0 | 0 | 0 | 1 | 1 |
| 1 | 0 | 1 | 0 | 1 | 1 | 0 | 0 |
| 1 | 0 | 1 | 1 | 0 | 1 | 0 | 0 |
| 1 | 0 | 1 | 1 | 1 | 1 | 0 | 1 |
| 1 | 1 | 0 | 0 | 0 | 0 | 1 | 1 |
| 1 | 1 | 0 | 0 | 1 | 1 | 0 | 0 |
| 1 | 1 | 0 | 1 | 0 | 1 | 0 | 0 |
| 1 | 1 | 0 | 1 | 1 | 1 | 0 | 1 |
| 1 | 1 | 1 | 0 | 0 | 1 | 0 | 0 |
| 1 | 1 | 1 | 0 | 1 | 1 | 0 | 1 |
| 1 | 1 | 1 | 1 | 0 | 1 | 0 | 1 |
| 1 | 1 | 1 | 1 | 1 | 1 | 1 | 0 |

Those skilled in the art will appreciate that the present invention is not limited to the specific exemplary embodiments which have been described herein for purposes of illustration and that numerous alternative embodiments are also contemplated. For example, the embodiment described with reference to FIG. 1 illustrates three pairings of single-bit values, each pair being a pair of single bit digits. However, it will be at readily apparent that the invention may be scaled and applied in embodiments using digits that are other than binary digits (i.e., using digits that may comprise an n-bit number, n being an integer). Furthermore, the principles illustrated in the exemplary embodiment may be applied to more or fewer than three pairings of multiplier bits with multiplicand bits.

In another aspect of the invention, those skilled in the art will recognize that the embodiment described with respect to FIG. 4 shows a combination of the principles illustrated in the above-described first embodiment with another aspect of the invention in which when pairs of multiplier bits are binary encoded with values ranging from zero to three, that the multiplication may be performed by substituting, in combination, a multiplication by minus one followed by a multiplication by a value of four (or vice versa). Thus the embodiment described with reference to FIG. 4 shows two pairs of multiply operations being performed simultaneously (in accordance with the first aspect of the invention), with each paired operation being a multiply between two multiplier bits and one multiplicand bit, in accordance with the second aspect of the invention.

Thus, the scope of the invention is therefore defined by the claims which are appended hereto, rather than the foregoing description, and all equivalents which are consistent with the meaning of the claims are intended to be embraced therein.

We claim:

1. A method of performing an iteration in an iterative method of multiplying a multiplicand by two or more 2-bit portions of a multiplier in a data processing apparatus, wherein each of the 2-bit portions of the multiplier is binary encoded to represent any of the numbers 0, 1, 2 and 3, the method comprising the steps of:

selecting one of the 2-bit portions of the multiplier in the data processing apparatus;

performing a first pass operation that comprises the steps of:

generating a first partial product representing the multiplicand multiplied by a value that is equal to the selected 2-bit portion of the multiplier if the selected 2-bit portion of the multiplier is not equal to 3, and representing the multiplicand multiplied by a value that is equal to minus one if the selected 2-bit portion of the multiplier is equal to 3; and conditionally setting a flag if the selected 2-bit portion of the multiplier is equal to 3; and performing a second pass operation that comprises the step of conditionally adding a value of 1 to a next 2-bit portion of the multiplier if the flag is set.

2. The method of claim 1, wherein the step of generating the first partial product comprises the steps of:

adding the multiplicand times the 2-bit portion of the multiplier to a previously generated partial product to form the first partial product if the selected 2-bit portion of the multiplier is not equal to 3; and if the selected 2-bit portion of the multiplier is equal to 3, then inverting the multiplicand and adding the inverted multiplicand plus one to the previously generated partial product to form the first partial product.

3. A method of multiplying a multiplicand by a multiplier in a data processing apparatus, wherein the multiplier comprises m or more 2-bit digits, wherein m is an integer greater than one, and each 2-bit digit is binary encoded to represent any of the numbers 0, 1, 2 and 3, the method comprising the steps of:

performing one or more passes in the data processing apparatus, wherein each pass generates a partial product; and combining the one or more partial products, wherein each pass comprises the steps of:

a) selecting an m-digit portion of the multiplier;
   b) selecting an m-digit portion of the multiplicand, wherein each of the multiplicand digits comprises 2 bits;
   c) simultaneously pairing each of the selected 2-bit digits of the multiplier with a respective one of the m selected 2-bit digits of the multiplicand and performing a multiply operation between each pair, thereby generating a number, m, of pair results;
   d) combining the m pair results and a previously generated partial product to generate a present partial product, wherein for a first pass, the previously generated partial product is zero; and
   e) selecting a next m-digit portion of the multiplicand and repeating steps c), d) and e) at least until each digit of the multiplicand has been paired with each of the m selected 2-bit digits of the multiplier, wherein the multiply operation between each pair comprises the steps of:

generating a pair result representing the one digit of the multiplicand multiplied by a value that is alternatively equal to 0, 1, 2 or −1 as a function of the value of the paired 2-bit digit of the multiplier and of the values of all multiplier digits of lesser significance than the paired 2-bit digit of the multiplier.

4. The method of claim 3, wherein the step of generating a pair result representing the one digit of the multiplicand multiplied by the value that is alternatively equal to 0, 1, 2 or −1 as a function of the value of the paired 2-bit digit of the multiplier and of the values of all multiplier digits of lesser significance than the paired 2-bit digit of the multiplier comprises the steps of:

when multiplication by −1 is to be performed, inverting all bits of the one digit of the multiplicand; and adding the inverted multiplicand plus one to a partial product to form the pair result.

5. The method of claim 3, wherein the step of simultaneously pairing each of the 2-bit digits of the multiplier with a respective one of the m selected 2-bit digits of the multiplicand is performed in a manner such that a least significant bit of pair results is of equal significance for all pair results.

6. The method of claim 3, wherein in the step of generating the pair result, the value by which the one digit of the multiplicand is multiplied is set equal to −1 as a function of whether the paired 2-bit digit of the multiplier or any of the values of all multiplier digits of lesser significance than the paired 2-bit digit of the multiplier are equal to 3.

7. An apparatus for performing an iteration in an iterative method of multiplying a multiplicand by two or more 2-bit portions of a multiplier in a data processing apparatus, wherein each of the 2-bit portions of the multiplier is binary encoded to represent any of the numbers 0, 1, 2 and 3, the apparatus comprising:

means for selecting one of the 2-bit portions of the multiplier;

means for performing a first pass operation that:

generates a first partial product representing the multiplicand multiplied by a value that is equal to the selected 2-bit portion of the multiplier if the selected 2-bit portion of the multiplier is not equal to 3, and representing the multiplicand multiplied by a value that is equal to minus one if the selected 2-bit portion of the multiplier is equal to 3; and conditionally sets a flag if the selected 2-bit portion of the multiplier is equal to 3; and means for performing a second pass operation that conditionally adds a value of 1 to a next 2-bit portion of the multiplier if the flag is set.

8. The apparatus of claim 7, wherein the means for performing the first pass operation that generates the first partial product comprises:

means for adding the multiplicand times the 2-bit portion of the multiplier to a previously generated partial product to form the first partial product if the selected 2-bit portion of the multiplier is not equal to 3; and means, operative if the selected 2-bit portion of the multiplier is equal to 3, for inverting the multiplicand and adding the inverted multiplicand plus one to the previously generated partial product to form the first partial product.

9. An apparatus for multiplying a multiplicand by a multiplier in a data processing apparatus, wherein the multiplier comprises m or more 2-bit digits, wherein m is an integer greater than one, and each 2-bit digit is binary encoded to represent any of the numbers 0, 1, 2 and 3, the apparatus comprising:

means for performing one or more passes, wherein each pass generates a partial product; and means for combining the one or more partial products, wherein each pass:

a) selects an r-digit portion of the multiplier;
b) selects an m-digit portion of the multiplicand, wherein each of the multiplicand digits comprises 2 bits;
c) simultaneously pairs each of the 2-bit digits of the multiplier with a respective one of the m selected 2-bit digits of the multiplicand and performs a multiply operation between each pair, thereby generating a number, m, of pair results;
d) combines the m pair results and a previously generated partial product to generate a present partial product, wherein for a first pass, the partial product is zero; and
e) selects a next m-digit portion of the multiplicand and repeats steps c), d) and e) at least until each digit of the multiplicand has been paired with each of the m selected 2-bit digits of the multiplier, wherein the multiply operation between each pair comprises:

generating a pair result representing the one digit of the multiplicand multiplied by a value that is alternatively equal to 0, 1, 2 or −1 as a function of the value of the 2-bit digit of the multiplier and of the values of all multiplier digits of lesser significance than the paired 2-bit digit of the multiplier.

10. The apparatus of claim 9, wherein generating a pair result representing the one digit of the multiplicand multiplied by the value that is alternatively equal to 0, 1, 2 or −1 as a function of the value of the paired 2-bit digit of the multiplier and of the values of all multiplier digits of lesser significance than the paired 2-bit digit of the multiplier comprises:

when multiplication by −1 is to be performed, inverting all bits of the one digit of the multiplicand; and adding the inverted multiplicand plus one to a partial product to form the pair result.

11. The apparatus of claim 9, wherein the means for simultaneously pairing each of the 2-bit digits of the multiplier with a respective one of the m selected 2-bit digits of the multiplicand operates in a manner such that a least significant bit of pair results is of equal significance for all pair results.

12. The apparatus of claim 9, wherein in the multiply operation between each pair, the value by which the one digit of the multiplicand is multiplied is set equal to −1 as a function of whether the paired 2-bit digit of the multiplier or any of the values of all multiplier digits of lesser significance than the paired 2-bit digit of the multiplier are equal to 3.

* * * * *